(12) United States Patent
Jackson

(10) Patent No.: US 6,435,349 B1
(45) Date of Patent: Aug. 20, 2002

(54) PACKAGING SYSTEM FOR REUSABLE FOOD OR BEVERAGE CONTAINERS

(75) Inventor: Stuart J. W. Jackson, Newmarket (CA)

(73) Assignee: Recopac Inc., Newmarket (CA)

( * ) Notice: Subject to any disclaimer, the term of this patent is extended or adjusted under 35 U.S.C. 154(b) by 7 days.

(21) Appl. No.: 09/672,701

(22) Filed: Sep. 29, 2000

Related U.S. Application Data

(60) Provisional application No. 60/175,045, filed on Oct. 1, 1999.

(51) Int. Cl.[7] .............................. B65D 75/00; B65D 5/42
(52) U.S. Cl. .............. 206/427; 229/125.37; 229/125.39
(58) Field of Search .......................... 206/427; 220/4.29, 220/7; 229/125.37, 125.39, 125.41, 198.3

(56) References Cited

U.S. PATENT DOCUMENTS

| | | | | |
|---|---|---|---|---|
| 1,301,310 A | * | 4/1919 | Paroubek | 229/125.41 |
| 2,348,551 A | * | 5/1944 | La Place | 229/125.41 |
| 2,688,507 A | * | 9/1954 | Ashworth | 229/125.39 |
| 4,034,909 A | * | 7/1977 | Toda | 229/125.39 |
| 4,333,602 A | * | 6/1982 | Geschwender | 229/125.39 |
| 4,556,167 A | * | 12/1985 | Fox et al. | 229/125.39 |
| 4,768,704 A | * | 9/1988 | Beckway et al. | 229/125.39 |
| 6,045,037 A | * | 4/2000 | McGeehin | 206/125.39 |

* cited by examiner

Primary Examiner—Luan K. Bui
(74) Attorney, Agent, or Firm—Marks & Clerk

(57) ABSTRACT

A reusable packaging system is provided, whereby goods of all sorts may be provided to a consumer and the case in which the goods are provided is re-used. The case resembles a standard rectilinear cardboard case, except that at least the planar bottom is assembled together by the use of at least four snap lock fittings, where the female halves of the snap lock fittings are located in one pair of flaps, and the male halves of the snap lock fittings are located in the other pair of flaps. The invention provides a box washer where information which has been printed by ink-jet printer on the outside surfaces of the box may be washed off, a corona treatment unit for treating the boxes so as to be re-printed, as well as case delatching and erecting equipment. Because the cases themselves are made of plastic sheet material which can be washed, printed on, and deinked, there is no wastage of forest resources.

18 Claims, 8 Drawing Sheets

Section 6-6

Section 8-8

PACKAGING SYSTEM FOR REUSABLE FOOD OR BEVERAGE CONTAINERS

CROSS REFERENCED APPLICATION

This application is based on, and claims priority from, U.S. Provisional Application Ser. No. 60/175,045, filed Oct. 1, 1999.

FIELD OF THE INVENTION

This invention relates to an environmentally benign and reusable plastic packaging system, and particularly relates to several aspects thereof. In the first instance, the invention is directed to a knock-down, foldable, reusable of plastic case for use in delivery of goods to a consumer. Another aspect of the present invention is directed to the installation whereby the reusable case is recovered and made ready for re-use.

BACKGROUND OF THE INVENTION

The genesis of the present invention is that it was first developed to find use in the brewery industry. However, the present invention is applicable to any industry where boxes or cases in which goods are delivered to consumers may be re-used for further delivery of further goods to further consumers. Several examples of such use for the reusable packaging system of the present invention include the automotive industry, where pre-packaged parts are delivered from their manufacturers to the automobile assembly plants; the snack food industry, where packaged snack foods such as potato chips, popcorn, and the like are delivered to supermarkets, where they are unpacked and put onto the shelf or re-sale to the consumer, and where the cases are folded or knocked down for re-use by the snack food manufacturer; the beverage industry generally, where beverages are packed in boxes or cases from which they are removed for sale as individual units to the retail customer; the food industry generally where bottled or canned food stocks of all sorts are likewise unpacked from the box or case in which they are delivered for sale from the shelf in individual units; aspects of the bakery industry where packaged loaves of bread of quantities of buns, cakes, or cookies, and the like are sold at retail in individual units; the brewery industry, especially that aspect of brewery industry which services the hospitality market where individual bottles of beer are sold for consumption at the time of sale by the dining or drinking customer; and even other aspects of the brewery industry where the customer takes home a sealed and packaged quantity of beer bottles. In most of those industries, except the automotive industry and, to some extent, the snack food industry and the brewery industry for sales only to the hospitality market, there is no re-use of the boxes, cases, or containers in which units of the goods being sold by their manufacturer are shipped to the customer. It is evident on its face that any reusable packaging system which provides for re-use of outer packaging boxes, cases, or other containers, could benefit the environment quite dramatically. Reusable plastic packaging cases, in particular, would result in considerably less consumption of paper and corrugated cardboard, resulting therefore in considerably less disposal and landfill. Accordingly, the present invention provides for considerable savings of natural resources, and considerable savings of money for the industries which adopt it.

For example, studies have indicated that the brewing industry spends more money on packaging each year— approximately $218 million in Canada and $6.5 billion in the United States—than on bottles that are used for bottling beer delivered to the market. One contributing factor is, of course, that bottles continue to be recycled: in Canada, over 90% of beer bottles are re-used about 15 times before they are replaced. Obviously, if the same or better practise could occur also with respect to the case in which beer bottles or any other products are delivered to their consumers, considerably less wastage would occur.

Several approaches, as evidenced for example in the brewery industry, include the re-use of cardboard boxes which are specifically employed in the hospitality industry. In such cases, however, the cardboard cases can only be used for a very few times, and because they are cardboard they are perishable if they get wet. Another approach, particularly as it is evident in the Far East, is to use molded plastic crates, particularly for delivery of bottled beer to the hospitality industry. However, such cases as are used in the Far East, and even cardboard boxes as they are used to deliver beer to the hospitality industry in North America, result in very significant storage problems because the cardboard boxes are not collapsed and the molded cases cannot be collapsed or folded.

Accordingly, another aspect of the present invention, leading to significant savings to any industry which employs the present invention, if the fact that the reusable plastic cases which are provided by the invention are collapsable or foldable when they are not being used, especially when they are being held in inventory at the factory where whatever goods that are to be shipped in the cases are manufactured.

Still further, the present invention provides for printing the plastic cases with information which is germaine to the goods being shipped therein, which information might even be so particular as to identify the particular brand of product which is the case. If, such as in a brewery, a number of brands of beer are shipped from the same brewery plant, there has heretofore been a requirement to store in inventory appropriate cases that are pre-printed with the information for each brand of beer being manufactured. The present invention provides that the cases may be cleaned and washed with such particularity that the information previously printed on them is washed away and fresh information can be placed thereon when the case is re-used.

Accordingly, while the present invention is directed in its first embodiment, being the embodiment which is described in specific detail herein, to the brewing industry, it is a fact that the present invention is directed to a complete system for distribution and re-use of containers which may be used in a variety of industries, as noted above. However, for convenience of use herein, the word "bottles" or "bottles" shall not in any way be inferred to mean specially bottles of beer, bottles of soft drink, or any other food or beverage, but shall mean any kind of good which are pre-packed and which are sold by the manufacturer in quantities of individual units. As noted above, another example which is particularly relevant may be snack foods, where pre-packed potato chips or other snack food products are being placed into reusable cases for shipping to a consumer such as retail store or the like.

The present invention recognizes the need for a system which avoids the wasteful present system of packaging in cardboard cases which are generally not reusable. However, to overcome a previous obstacle in respect of the provision of molded plastic cases, the present invention provides for the reusable cases which are foldable, and on which various information, branding, advertising materials, or the like, can be printed, removed, and replaced with other information upon re-use of the cases in keeping with the invention.

SUMMARY OF THE INVENTION

In view of the above, it is an object of the invention to provide a system which will permit the use and re-use of plastic cases, which preferably are foldable.

To that end, the present invention provides a reusable packaging system for use in delivery of goods in a case to a consumer and return of the case to a supplier of goods for re-use, the reusable system comprising a collapsable case, a case delatcher, a box washer, a case erector, a case filler, and a case sealer.

A case in keeping with the present invention has a planar bottom, a planar top, opposed planar sides, and opposed planar ends. In other words, the case is rectilinear in configuration. A provision of the present invention is that the case is made from plastic sheet material.

The planar bottom of a case in keeping with the present invention comprises a pair of side flaps and a pair of end flaps. One of the pair of side flaps or the pair of end flaps overlies the other pair of flaps when the case is in assembled condition. The overlying pairs of flaps are secured one to another by at least four snap locks, each comprising mating male and female snap lock halves which are arranged to be latched together when the overlying pairs of flaps are in their overlying condition.

The planar top of a case in keeping with the present invention comprises at least one pair of flaps which close the case when they are in a case-closing condition, whereat they are perpendicular to the opposed planar sides and the opposed planar ends, and they are parallel to the planar bottom of the case.

The case delatcher and the other equipment described herein are located at the factory or plant at which the goods to be placed into the case are being manufactured. The delatcher is arranged so as to mechanically delatch the snap locks of an empty case which has folded open top flaps, and to fold open the side flaps and end flaps of the case bottom.

The box washer is arranged to wash and dry open cases that have all top and bottom flaps in a folded open condition, and to fold each washed open case to a flat configuration.

The case erector is arranged to erect a case from a flat configuration to an erected condition whereby the pair of bottom flaps and the pair of end flaps of the planar bottom are assembled together, and the flaps are kept in their open condition.

The case filler is arranged so as to re-fill a washed and erected case with fresh goods for delivery to a consumer.

The case sealer is arranged to fold the top flaps to their case-closing condition and to apply a sealing tape thereacross so as to seal the filled case.

A further aspect of the present invention is to provide a corona treatment unit arranged to corona treat the outer surfaces of the top, bottom, sides, and ends, of a washed open case when in its flat configuration.

The present invention also provides further for and ink-jet printer that is used for printing information on selected outer surfaces of an erected sealed case.

Typically, plastic sheet material which is used to make the plastic case of the present invention is polypropylene sheet material, specially corrugated polypropylene sheet material. However, the plastics materials may be chosen from the group which consists of polypropylene sheet, polyethylene sheet, co-polymers of polypropylene and polyethylene sheet, polystyrene sheet, corrugated polypropylene sheet, corrugated co-polymers of polypropylene and polyethylene sheets, and corrugated polystyrene sheet.

In a particular aspect of the present invention, the snap lock comprises a male snap lock half and a female snap lock half. The male snap lock half has a centrally located stem with a closed cap end surrounded by a radially outwardly directed lip, so that the diameter of the closed cap end at the radially directed lip is greater than the diameter of the stem. There is a skirt which surrounds the stem and extends perpendicularly thereto; and the skirt is provided with a plurality of corner protrusions which extend upwardly from the skirt in spaced relation to the stem and to one another. The female snap lock half has a centrally located opening surrounded by a V-shaped channel and a radially inwardly directed lip. The diameter of the opening is greater than the diameter of the stem and less than the diameter of the closed cap of the male snap lock half, at its radially outwardly directed lip. The female snap lock half is also provided with a skirt which surrounds the opening, and the plurality of corner channels which are shaped and dimensioned so as to receive and accommodate the plurality of corner protrusions therein, also in space relation to the opening and to one another.

The ink which is used for printing information on the erected sealed case at the ink-jet printer is washable away from the surfaces which have been printed by the ink-jet printer during a washing action in the box washer.

When used in the beverage industry, in particular, the system of the present invention further comprises a bottle remover which will remove empty returned bottles from a case when they are returned to a beverage bottling plant for re-use, and before the case is sent to the case delatcher.

In such circumstances as described immediately above, the case filler is a bottle filling machine and a bottle packing machine for packing filled bottles of beverage into a washed and erected case.

Typically, each of the male and female snap lock halves has a quadrilateral configuration, the male snap lock half having four corner protrusions, and the female snap lock half having four mating corner channels.

In any event, the male and female snap lock halves are secured to respective ones of the pairs of side flaps and end flaps of the bottom of the case, in such a manner that they are not removable therefrom.

When ink is used at the ink-jet printer, it is adhered to any selected outer surface of the case which has been corona treated in the corona treatment unit. However, the ink is carried by a solvent which is washable by the box washer, so that after the washed case leaves the box washer it has no information printed thereon.

The box washer is typically arranged to wash the ink which has been printed on a case using water and a washing solution which are sprayed under pressure onto the case being washed.

Moreover, the box washer will, in keeping with the present invention, comprise a closed loop system, so that after the water and washing solution have been used, they are filtered, treated, and re-used.

The corona treatment unit is arranged so as to expose the surfaces of the case that are being corona treated to gas flames.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention; as to its structure, organization, use and method of operation, together with further objectives and advantages thereof, will be better understood from the following discussion.

Figure 1:
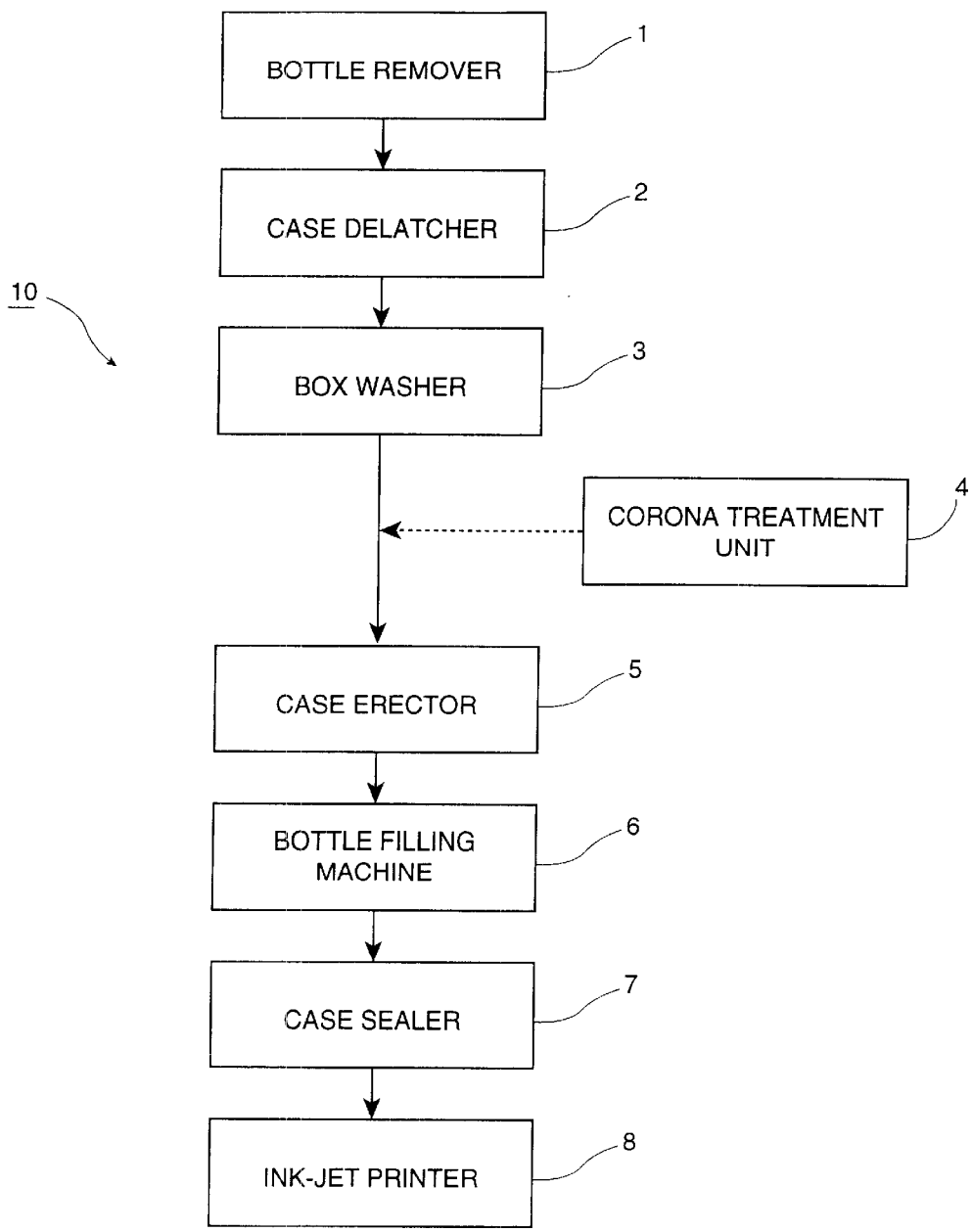
FIG. 1 is a flow diagram showing a typical setup of the reusable packaging system of the present invention, particularly as it is found in such as the brewing industry.

Turning first to FIG. 1, an overall system in keeping with the present invention, including several optional pieces of equipment which contribute to the reusable packaging system of the present invention, is shown. That system 10 may include the following components, each of which is described briefly, immediately below, and in greater detail hereafter;

Item 1 is a bottle remover whose purpose is to remove bottles from the top of a returned case, without destroying the case.

Item 2 is a case delatcher which mechanically delatches the snap locks at the bottom side of the case, so as to open them and unfold them.

Item 3 is a box washer which cleans the open and unfolded case. It may optionally be equipped so as to remove the ink and any glue residue which may be present on the box; and after it is washed the box is rinsed and dried, and then folded flat.

Item 4 is essentially off line, and is a corona treatment unit which treats the surface of a folded plastic case which is to be ink-jet printed.

Item 5 is a case erector which takes a case from its flat position, usually from a skid taken from inventory, opens the case, and folds and latches the bottom flaps thereof.

Item 6 is a case filler machine, which typically may be a bottle filling machine or other machine whose purpose is to place goods into the case. In some circumstances, although not usually, it is possible that Item 6 could be a station or a number of stations at which the case is manually filled.

Item 7 is a case sealer which folds down the flaps of the case and applies a sealing tape across the top flap so as to seal the case.

Item 8 is an optional ink-jet printer which may be employed to print whatever information is required to be printed on the case, after it has been filled and sealed.

If the case is to be filled with such as beer bottles, typically an insert will be placed into it first, so as to preclude the bottles from hitting each other during transportation. Typically such insert is one that comprises a grid having interlocking strips and which establishes separate compartments inside the case, one for each bottle.

It has been noted that plastic cases in keeping with the present invention can typically be folded so as to reduce storage space requirements when they are not filled with goods of any sort. Thus, plastic cases in keeping with the present invention mimic cardboard cases, in that they have four foldable bottom flaps—two side flaps and two end flaps—and typically four but at least two top flaps. Preferably, and when they are used in such industries as the brewing industry, the plastic cases in keeping with the present invention are designed to have the same dimensions as the cardboard cases which are currently used. Moreover cases in keeping with the present invention may be easily manufactured in the first instance by die-cutting and sonic or solvent welding of the one seam which is required between a planar and end panel and a planar side panel.

Figure 2:
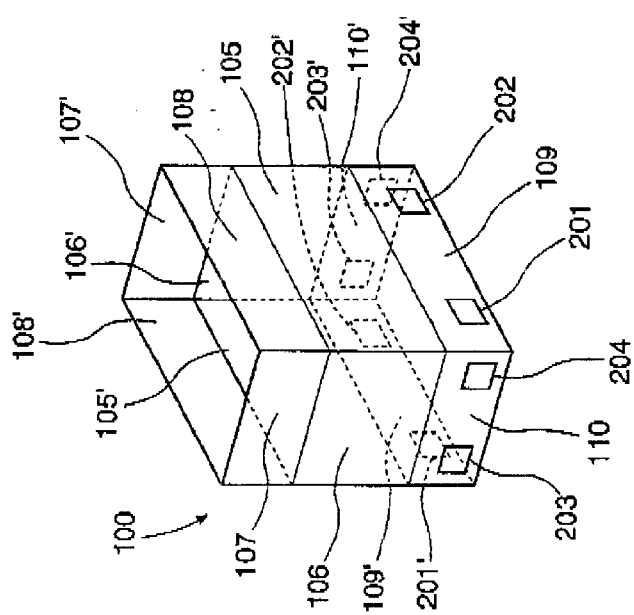
FIG. 2 is a perspective view side view of a case according to the present invention.
Figure 12:
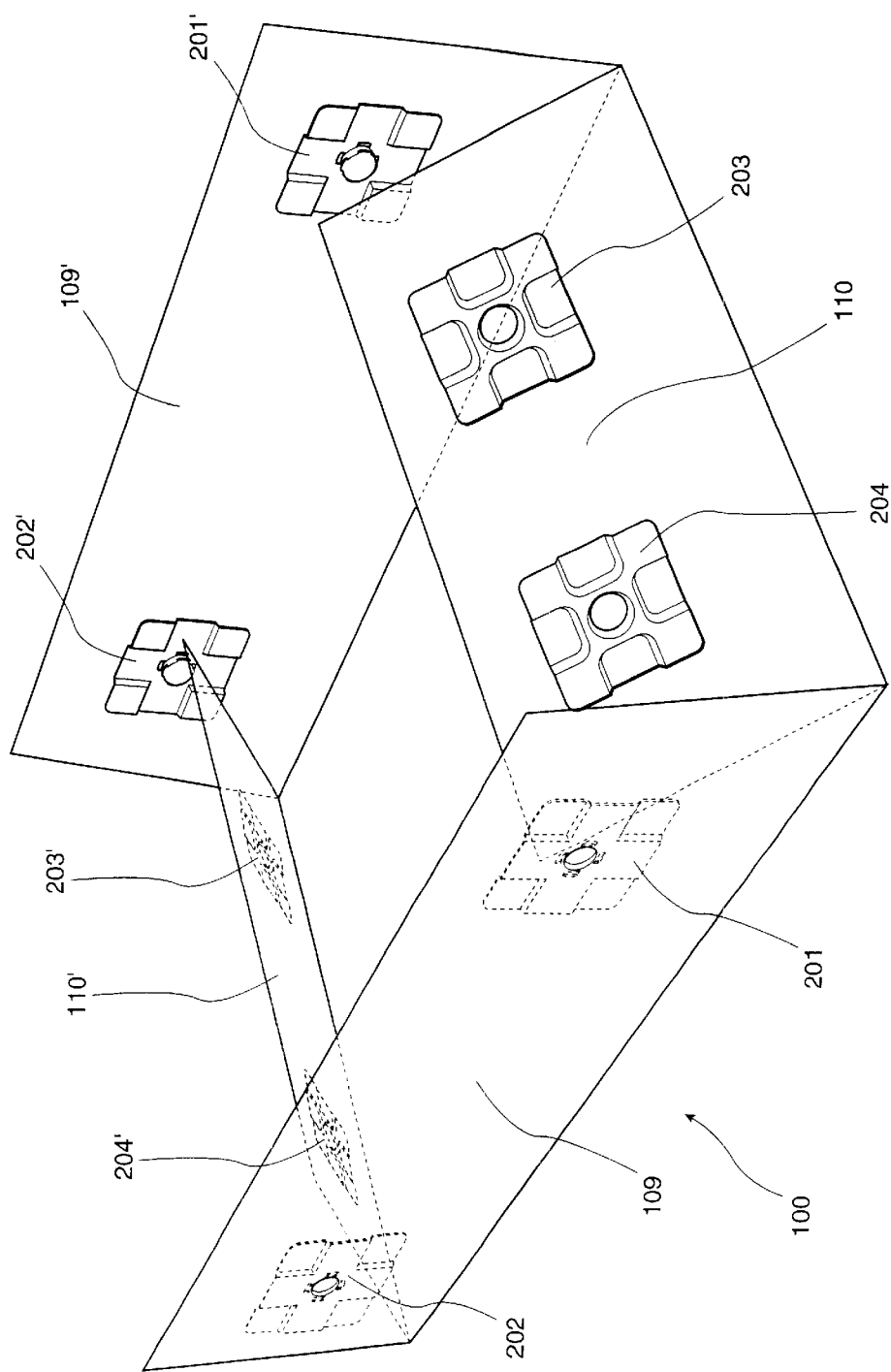
FIG. 12 is a perspective side view of the bottom of a case in keeping with the present invention; showing the respective location of the male and female snap lock halves.

Turning now to FIGS. 2 and 12, specific features of a case 100 in keeping with the present invention are shown. The case has a planar bottom, planar top, opposed planar sides, and opposed planar ends. The opposed planar sides are shown at 105 and 105', and the opposed planar ends are shown at 106 and 106'. The planar bottom comprises a pair of side flaps 109 and 109', and a pair of end flaps 110 and 110'. Typically, as can be inferred from FIGS. 3 and 4, and as shown in FIG. 12, one of the pair of side flaps 109, 109' overlies the pair of end flaps 110, 100', when the case is in its assembled condition, although the reverse situation could apply in some circumstances. Each of the bottom flaps 109, 109', 110, 110', is foldably connected to a respective side or end panel 105, 105', 106, 106', of the case 100. Likewise, the top may comprise end top panels 107 and 107', and at least it will comprise side panels 108 and 108', once again foldably connected to the respective end side panels 106, 106', 105, 105'. The side flaps and end flaps of the planar bottom are provided with four snap locks, each of which comprises a mating male and female snap lock half which are arranged to be latched together when the overlying pairs of flaps are in their overlying condition. Thus, flap 109 is provided with the first connecting means 201 and 202, and side flap 109' is provided with connecting means 201' and 201'. The mating connecting means 203 and 204 are found on end flap 110, and 203' and 204' are found on end flap 110' are folded inwardly and then the side flaps 109 and 109' are folded so as to overlie the end flaps, and particularly so that the first connecting means 201 is arranged to cooperate with the connecting means 204, connecting means 202 cooperates with connecting means 204', connecting means 202' cooperates with 203', and connecting means 203 cooperates with 201'.

Figure 5:
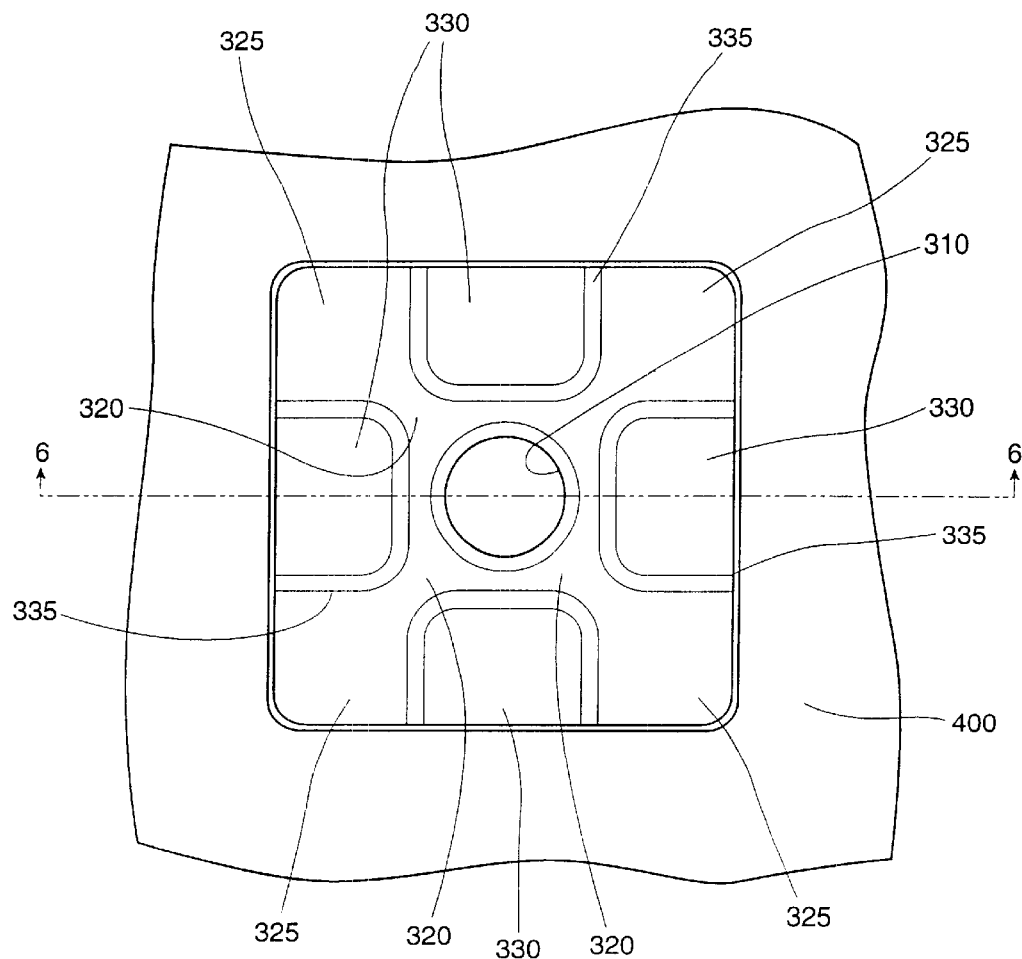
FIG. 5 is a plain view of a female snap lock half in keeping with the present invention.
Figure 6:
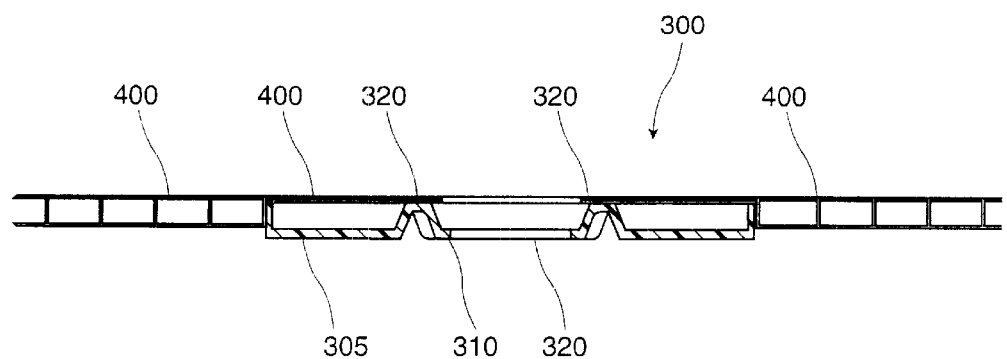
FIG. 6 is a sectional view taken along the line 6—6 in FIG. 5.

Each of the connecting means 201, 201', 202, and 202', is typically a female snap lock half; and the remaining connecting means 203, 203', 204, and 204', are typically Referring to FIGS. 5 and 6, some more specific description of a female snap lock half is given below. In the following discussion, the so-called female snap lock half is designated 300, and it is arranged to latch to and cooperate with a so-called male snap lock half 500, to form a locked together connection 600 (see FIGS. 5 through 11). In FIGS. 5 through 9, the surrounding flap material is designated generally at 400; it is shown as corrugated panel, but other material could be used as will be evident to one skilled in the box-making art.

Figure 3:
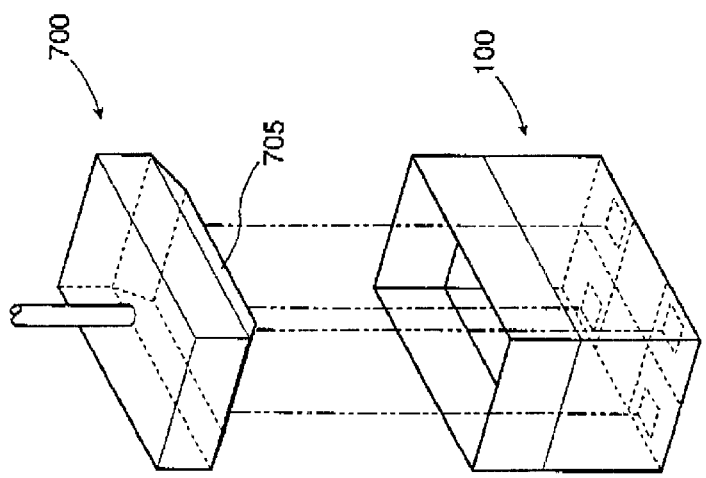
FIG. 3 is a perspective view showing a case in co-operative relation with case latching apparatus in keeping with the present invention.

As seen in FIGS. 2 and 3, the female snap lock half 300 is substantially rectangular, having a first major surface 303 and a second major surface 305. The second major surface 305 has a first central hole 310 which is surrounded by first indentation channels 320, generally of a V-shaped configuration. The central hole 310 has a first annular lip 315. First indentation channels 320 expand at the four corners of the second major surface 305 into four corner indentations 325. Four protrusions 330 are thus formed along each side of the female snap lock half 300, surrounded by a slope 335 which leads to the first indentation channels 320, and the corner indentations 325.

Figure 7:
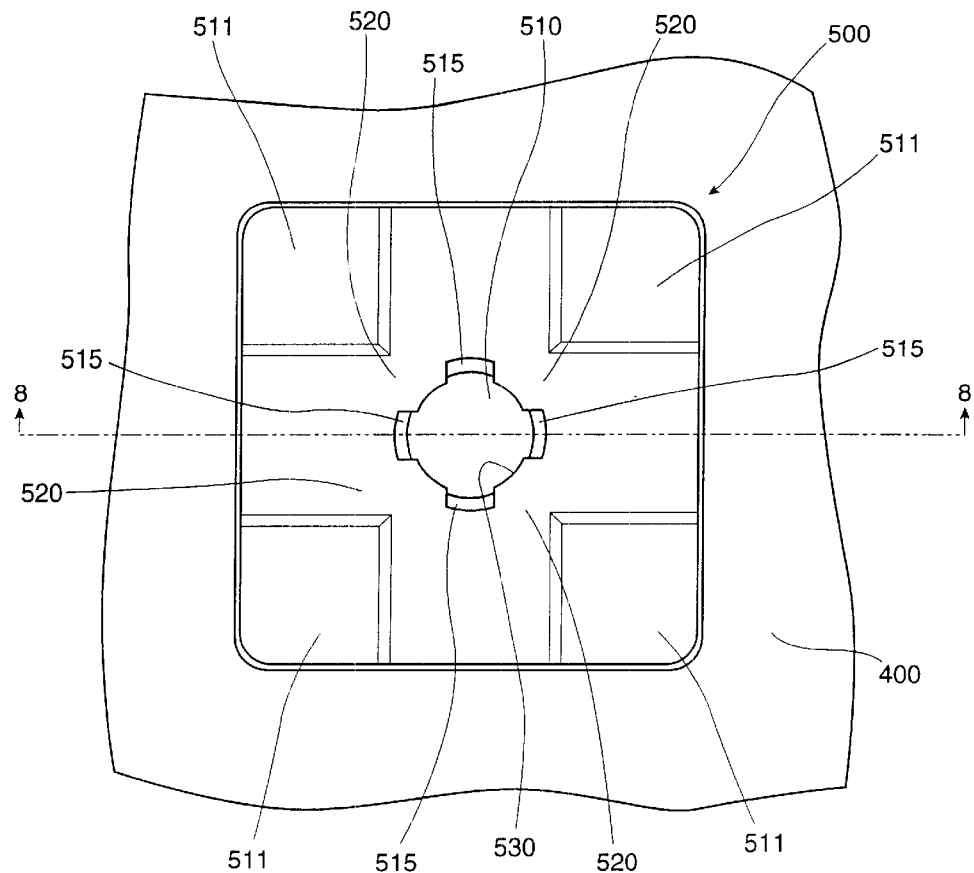
FIG. 7 is a plain view of a male snap lock connector half in keeping with the present invention.
Figure 8:
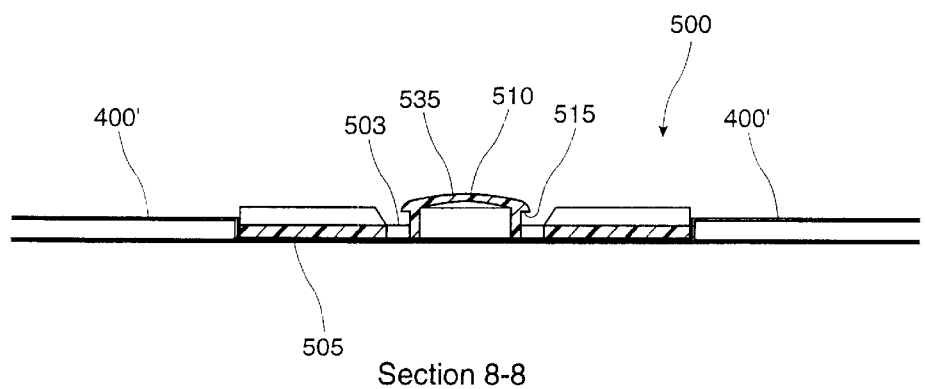
FIG. 8 is a sectional view taken along line 8—8 in FIG. 7.
Figure 9:
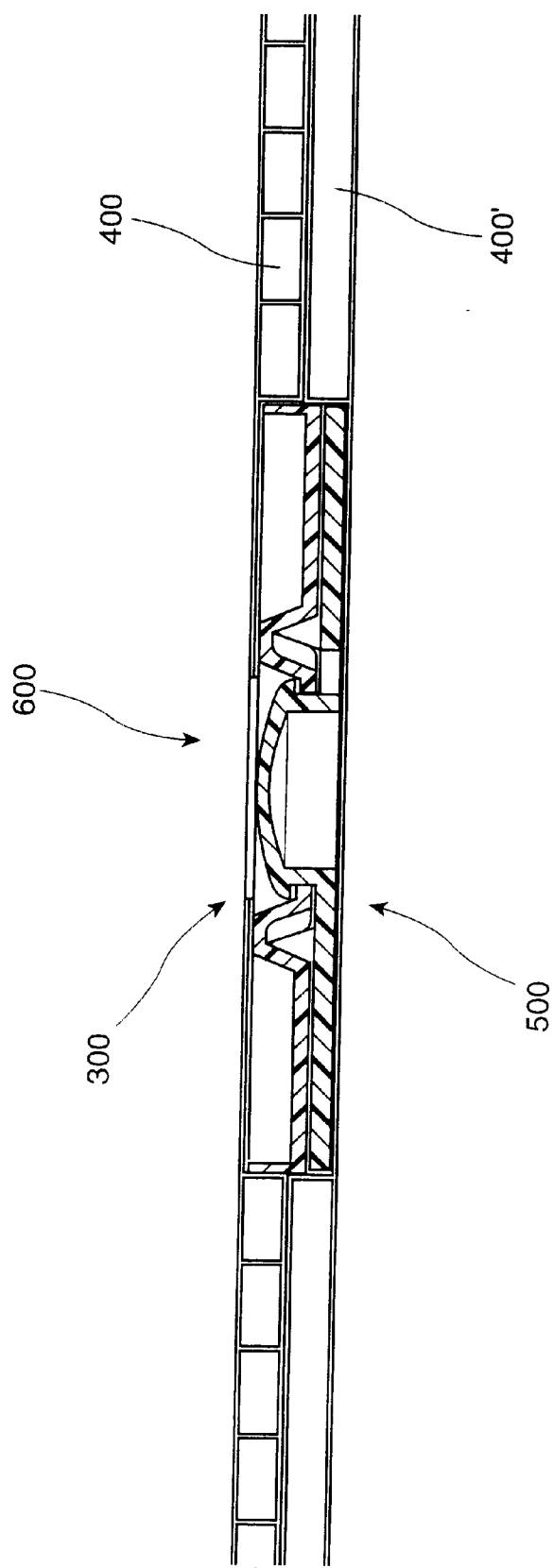
FIG. 9 is a sectional view of the male and the female snap lock halves, taken in the same direction as lines 6—6 or 8—8 of FIGS. 5 or 7, respectively.
Figure 10:
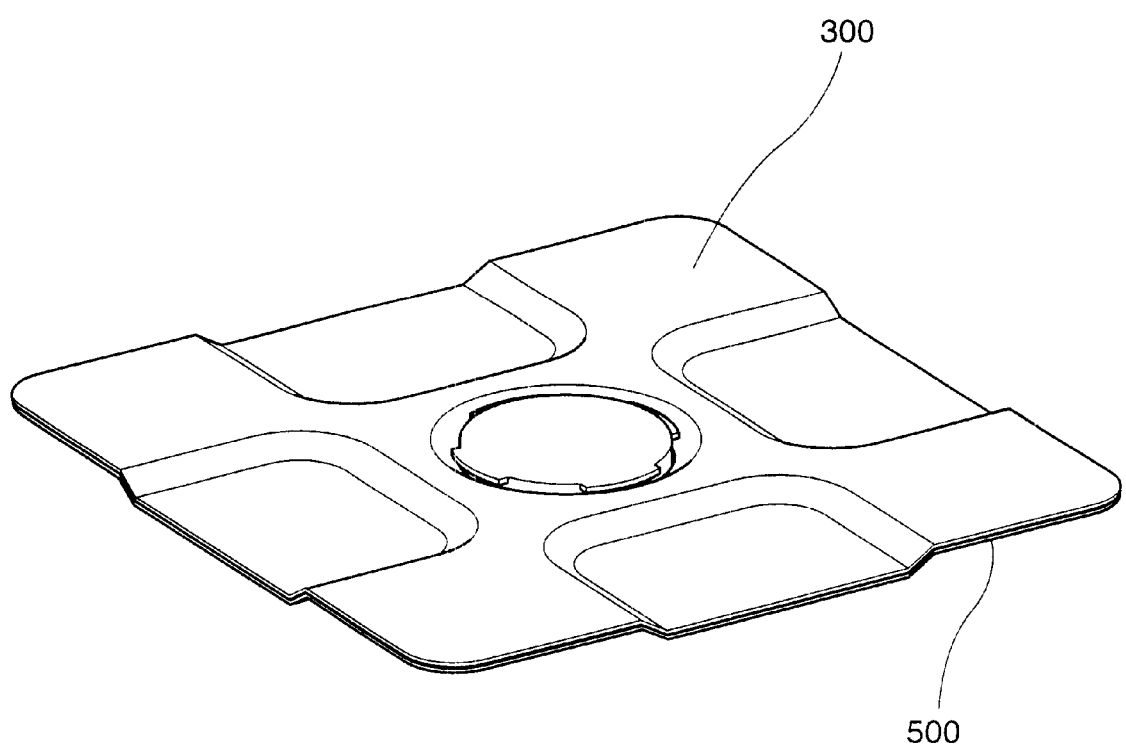
FIG. 10 is a perspective view of an assembled snap lock connector in keeping with the present invention.
Figure 11:
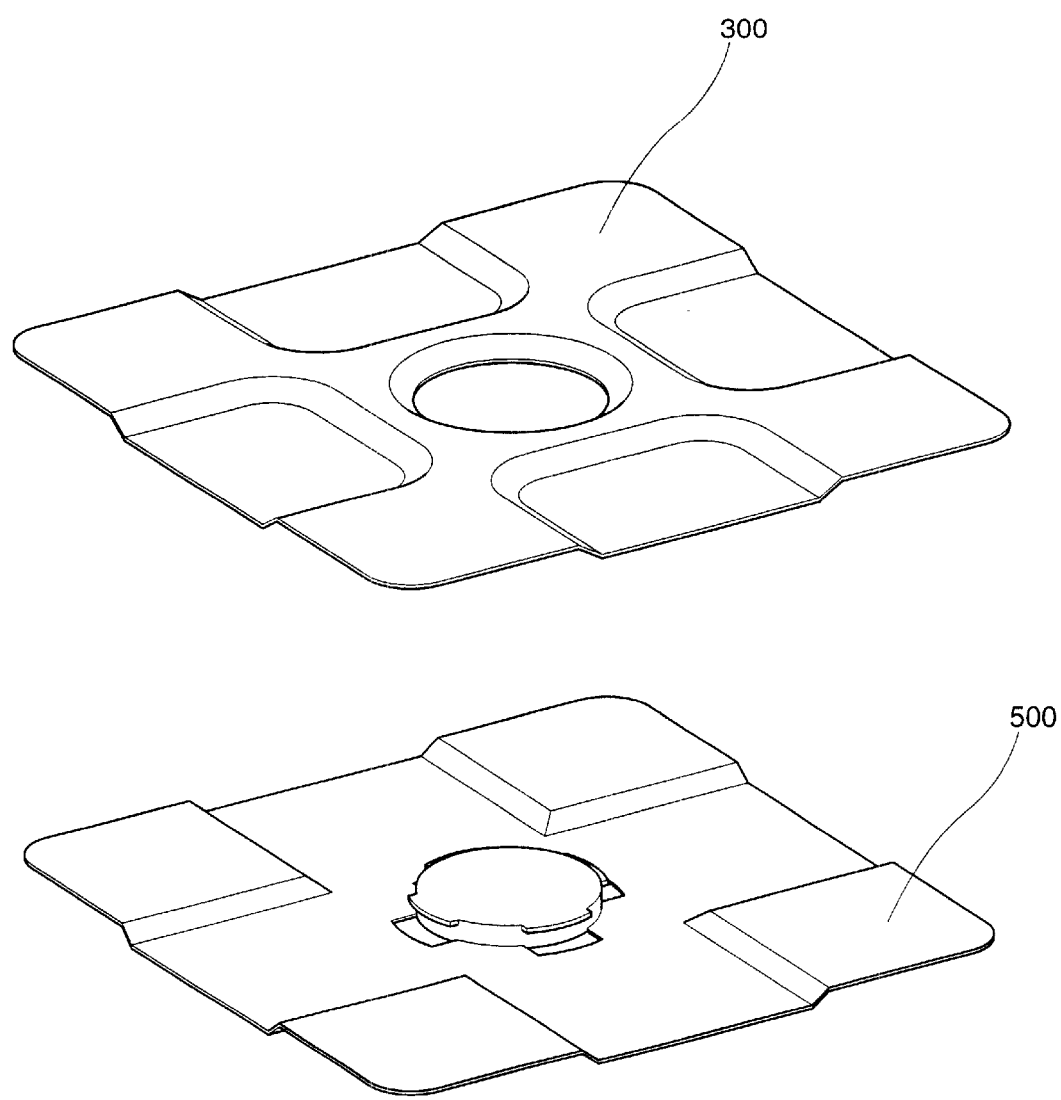
FIG. 11 is a perspective view of the snap lock connector where the male and female snap lock halves are dis-engaged from each other.

Turning now to FIGS. 7 and 8, the male snap lock half 500 is shown. It also is substantially rectangular or square in configuration, having a first major surface 503 and a second major surface 505. The male snap lock half 500 has a central protrusion 510 which is surrounded by a second indentation channel 520. The central protrusion or stem 510 has a second lip 515, which may be an annular lip or it may be four separate lip segments. The central protrusion or stem 510 has a solid cap 535. There are four corner As seen in FIG. 9, the relative positions of the female and male snap lock halves 300 and 500 are shown when they are latched together in engagement so as to form the locked together connection 600. The cooperation between the first annular lip 315 and the second lip 515 is apparent. In this position, the corner indentations 325 hold the four corner protrusions 511 so as to prevent any lateral movement or twisting of the female snap lock half relative to the male snap lock half 500, or *vice versa*.

Because cases in keeping with the present invention are reusable, and are cleanable. Thus, they are made from a plastic material, preferably a plastic corrugated material such as COROPLAS™, rather than the usual corrugated cardboard material that is traditionally used. COROPLAS™ is made from a polypropylene material which is a similar material to that from which the snap lock halves are also made.

Whether the case is mechanically or manually assembled and disassembled, the male and female snap lock halves contribute to the latching or delatching operations. However, where delatching is to be automated, holes 530 are formed in the flaps in which the female snap lock halves 300 are installed, so as to contribute to the delatching operation, as discussed hereafter.

In manufacturing any case 100, in keeping with the present invention, sheets are first fed into a standard case die-cutting machine which is similar to those used for the manufacture of paper cases of boxes. If the case is to be intended for automated processing, then the four delatching holes 530 are cut into the flaps of the box where the male snap lock halves 500 are to be placed.

The snap lock halves are then fitted into the thickness of the respective flaps where they are to be placed. Typically, this step is made with a pre-heated pad or a pad which may be heated by sonic welding, so that a pad may be pressed into the sheet of material. Alternatively, the material of the flaps can be embossed so as to receive the respective snap lock halves. In any event, a recess is created for the snap lock halves, so that when the flaps are folded and connected together, the flaps touch without a gap being created by the thickness of the snap lock halves.

The snap lock halves may be sonically welded or solvent welded to the material of the flap of the box where they are to be placed.

Manual assembly of the flaps requires an individual who will take a folded case, open it, and manually push the bottom flaps together to engage the male and female snap lock halves. The top of the case may or may not have folding flaps, but it will at least have a pair of side flaps as discussed above. In any event, the top of the case may also be provided with connectors similar to those used on the bottom of the case; more typically however, the side flaps of the top are sealed together using a sealing tape in a sealing machine, as described hereafter.

In any event, it will be apparent that the case can be collapsed simply by grasping the outer flaps and pulling them apart at the bottom, or pushing them apart as described hereafter.

Of course, most industries, particularly high volume industries such as the brewing industry, require fall automation of all of their in-line processing. Thus, automated latching and delatching of cases in keeping with the present invention can be achieved, as will now be described.

If a case 100 is to be erected, it would first be unfolded from a folded or collapsed condition so as to assume a condition such as that shown in FIG. 2. Then, the bottom flaps are folded in the correct sequence and a flat faced ram 700, as seen in FIG. 3, travels into the case and presses on the bottom of the case so as to latch all four connector pairs of snap lock halves, at the same time. Thereafter, the semi-erected, open case 100 will be sent further processing, filling, sealing, and so on, as described hereafter.

Figure 4:
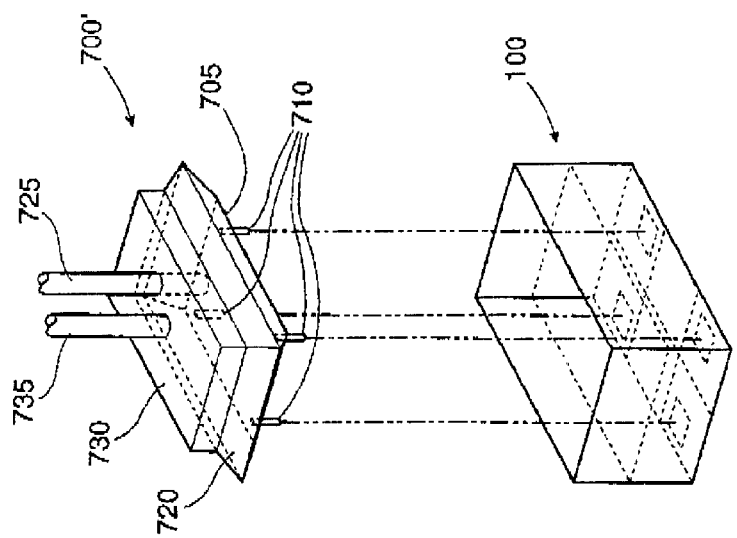
FIG. 4 is a perspective view showing a case in co-operative relation with a case delatching apparatus in keeping with the present invention.

When a case is returned to the plant for re-use, it must first be folded or knocked down. In that instance, the case 100 first travels to a case delatcher 2, where a two-piece delatching ram 700' is found as shown in FIG. 4. Here, there are four pins 710 which correspond in position to the holes 530 found in the flaps where the female snap lock halves are located, and the pins 710 press against the male connector caps and delatch all of the caps from the female snap lock halves at the same time.

It will be noted that there is an angled bottom 705 at both rams 700 and 700', which is tapered so as to allow easy entry of the respective ram into the case 100, and for dimensional alignment of the case 100 once the ram is inside. This, of course, permits for correct registration of the delatching pins 710. After the case has been delatched as a consequence of an action as shown in FIG. 4, it will then be folded and stored, awaiting its next cycle.

The delatching ram 700' preferably has a lower part 720, which incorporates the angled bottom 705, and an upper part 730. The lower part and the upper part are divided along a substantially horizontal plane as is shown in FIG. 4. The corners and sides of the two-piece delatching ram 700' are curved from the angled bottom inwards to the top in a concave shape. The curved shape facilitates gripping the top flaps of the case, which are folded inwards and downwards when the case arrives at the delatching station 2. The delatching ram 700' is inserted into the case, the upper part 730 is lifted upwards thereby bringing the top flaps with it so that the top flaps are folded to an upward position, whilst at the same time the lower part 720 is pressed further downwards to delatch the bottom flaps and to fold them to an outwards and downwards position as seen in FIG. 2.

There now follows some further discussion of the reusable packaging system of the present invention, particularly with reference to FIG. 1. As noted, not all of the elements shown in FIG. 1 are necessarily present in a packaging system which would otherwise be in keeping with the present invention, but typically the system includes at least a case delatcher 2, box washer 3, case erector 5, case filling machine 6, and case sealer 7. For example, if unprinted or permanently printed cases are to be used, then the corona treatment unit 4 and the ink-jet printer 8 will not be present. However, the present invention provides that fresh printing can take place every time a case goes through the system, or at selected intervals.

Referring now to the various components of the system, the following discussion is germaine to an understanding of the present invention.

The Case 100

As noted above, the present invention makes use of a folding plastic box or case, having four bottom panels which fold onto each other and which are secured to each other by a releasable snap lock fastener. The top flaps of the case may be closed by any suitable means, but typically they are taped shut, so that the consumer or end user will remove the tape so as to open the case.

Bottle Remover 1

This module is intended to remove empty bottles from a case, when it is returned to such as a brewery. Often, in present day breweries where cardboard boxes are used for return of bottles to the brewery, a case opener involves a system which slices the cartons open, thereby destroying it. In keeping with the present invention, machines of the sort which have previously been used in breweries can be employed to remove bottles from the top of the case without destroying the plastic case. Otherwise, the bottle remover is a typical machine which is commonly found in most breweries.

Case Delatcher 2

In this module, empty boxes pass under a frame in which delatching of the bottom flaps of the box occurs, in a manner as described above with respect to FIG. 4. After the bottom flaps have been delatched, the open case will pass to the box washer 3, with all panels open and generally in vertical orientation, as shown in FIG. 2.

Box Washer 3

In this module, the boxes are passed through a washing machine which is a key component of the present system. The box washer 3 has a washing tunnel, where the cases are cleaned and de-inked if they have information printed on any of the panels. In any event, each case is cleaned inside and outside, the ink is removed together with any glue residue that might exist, and the washing step is followed by a clean water rinse, a drying step—which may involve blowing warm air past the inside and outside surfaces of the case—and then the case is folded flat.

Typically, especially when the cases are made from corrugated panels, pulsating high and low air pressure is used to clean to corrugate flutes after the case has been folded.

A box washer structure is typically 5 to 6 metres long, about 2 metres high, and about 1.5 metres wide. It is adapted to utilize conventional compressed air and electrical sources of energy found in any manufacturing facility.

As noted above, for environmental reasons, as well as costs purposes, the wash solution and rinse water that are used in the box washer 3 may be re-used in a closed loop system. The wash solution and the rinse water are separately recycled by filtering and treating them to restore their original properties for washing and rinsing once again.

Corona Treatment Unit 4

Existing corona treating equipment is known, but must be adapted so as to suit the folded geometry of a case in keeping with the present invention. The outer surfaces of a case, in folded condition, are treated with flames—typically, gas flames. The equipment is designed so as to treat both top and bottom portions of a folded case, at the same time. The corona surface treatment prepares the plastic for ink-jet printing. Typically, the corona treatment unit 4 is off-line, since a case is typically to be treated only every four or five uses.

Case Erector 5

In this module, flattened boxes are taken from inventory, and are erected in a manner described above with respect to FIG. 3. Typically, a supply of folded boxes is provided on a skid, each is taken one at a time from the skid and placed onto the machine to be opened and then to have the bottom flaps latched.

Case Filler 6

As noted above, this module may be such as a bottle filling machine of the sort typically found in breweries, or any other goods handling machinery or personnel whose job or purpose is to place goods into the case for delivery to the consumer. In the circumstance where the case in keeping with the present invention is used in the brewery industry, the cases have the same dimensions as cardboard boxes, so that a typical bottle filling machine and bottle placing machine may be used.

Case Sealer 7

In this module, a filled case passes through a case sealer which closes at least the two top flaps and applies a tape across them so as to seal the case. Such tape applying machinery is well known and is used in many industries. Preferably, the tape provides tamper-proof evidence, such as by changing colour when it is pulled; but at the same time, the tape is easy to pull away from the plastic surfaces of the case. Of course, it is possible that the tape may also be printed for promotional opportunities.

Ink-Jet Printer 8

In this module, two ink-jet printers may be used, the first of which will print the side and top surfaces of the case, and the second of which will print the end surfaces of the case after the case has changed its direction of travel so as to move sideways rather than lengthwise. Of course, individual cases may be printed with unique promotional opportunities, subject to the software which drives the ink-jet printers.

It is not uncommon for the different modules or stations which have been described above to be connected one to another via suitable conveyor means, so as to move cases from one station to another or as otherwise required. Of course, any station may operate in a batch mode.

General

In any event, all of the equipment in keeping with the present invention is either modified from existing equipment or is essentially as described above. All such equipment is capable of being driven from existing compressed air and electrical energy sources in any factory or plant, with appropriate water and hydraulic connections as well, and as required.

Typically, a fully operating reusable packaging system as described above may function at a rate of anywhere from 25 to 60 cases per minute—assuming, for example, cases having 24 bottles of beer in each case.

There has been described a packaging system which is most evidently environmentally benign. It provides for the use of reusable plastic cases, and the present invention also provides a complete system for assembling, washing, filling, and sealing the cases. As well, other optional machinery or modules are provided for, as may be necessary or required, depending on the purposes to which the reusable cases are to be put.

All of the discussion herein is by way of illustration and explanation only, and is not intended to be limiting, nor to suggest or propose specific limitations as to any specific integer or module which has been described above.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A reusable packaging system for use in delivery of goods in a case to a consumer and return of the case to a supplier of goods for re-use, said reusable packaging system comprising a collapsible case, a case delatcher, a box washer, a case erector, a case filler, and a case sealer;

wherein said case has a planar bottom, a planar top, opposed planar sides, and opposed planar ends, and is made from plastics sheet material;

wherein said planar bottom comprises a pair of side flaps and a pair of end flaps, wherein one of said pair of side flaps or said pair of end flaps overlies the other pair of flaps when in an assembled condition, and wherein said overlying pairs of flaps are secured one to another by at least four snap locks, each comprising mating male and female snap lock halves, arranged to be latched together when said overlying pair of flaps are in their overlying condition;

wherein said planar top comprises at least one pair of flaps which close said case when they are in a case-closing condition so as to be perpendicular to said opposed planar sides and said opposed planar ends, and so as to be parallel to said planar bottom;

wherein said case delatcher is arranged so as to mechanically delatch said snap locks of an empty case having folded open top flaps, and to fold open said side flaps and said end flaps of said case bottom;

wherein said box washer is arranged to wash and dry open cases having all top and bottom flaps in a folded open condition, and to fold each washed open case to a flat configuration;

wherein said case erector is arranged to erect a case from a flat configuration to an erected condition whereby said pair of bottom flaps and said pair of end flaps of said planar bottom are assembled together, and said top flaps are in their open condition;

wherein said case filler is arranged so as to re-fill a washed and erected case with fresh goods for delivery to a consumer; and wherein said case sealer is arranged to fold said top flaps to their case-closing condition and to apply a sealing tape thereacross so as to seal said filled case.

2. The reusable packaging system of claim 1, further comprising a corona treatment unit arranged to corona treat the outer surfaces of the top, bottom, sides, and ends, of a washed open case when in its flat configuration.

3. The reusable packaging system of claim 1 further comprising an ink-jet printer for printing information on selected outer surfaces of an erected, sealed case.

4. The reusable packaging system of claim 1, wherein said plastics sheet material is chosen from the group consisting of polypropylene sheet, polyethylene sheet, co-polymers of polypropylene and polyethylene sheet, polystyrene sheet, corrugated polypropylene sheet, corrugated co-polymers of polypropylene and polyethylene sheet, and corrugated polystyrene sheet.

5. The reusable packaging system of claim 1, wherein each snap lock comprises a male snap lock half and a female snap lock half;

wherein said male snap lock half has a centrally located stem with a closed cap end surrounded by a radially outwardly directed lip, so that the diameter of said closed cap end at said radially directed lip is greater than the diameter of said stem, a skirt surrounding said stem and extending perpendicularly thereto, and a plurality of corner protrusions extending upwardly from said skirt in spaced relation to said stem and to one another; and wherein said female snap lock half has a centrally located opening surrounded by a V-shaped channel and an inwardly and radially directed lip, wherein the diameter of said opening is greater than the diameter of said stem and less than the diameter of said closed cap at said radially outwardly directed lip, a skirt surrounding said opening, and a plurality of corner channels shaped and dimensioned to receive and accommodate said plurality of corner protrusions therein and in spaced relation to said opening and to one another.

6. The reusable packaging system of claim 3, wherein the ink used for printing information on said erected sealed case at said ink-jet printer is washable away from the surfaces which have been printed by said ink-jet printer during a washing action in said box washer.

7. The reusable packaging system of claim 1, when used in a beverage industry, and wherein said system further comprises a bottle remover to remove empty returned bottles from a case when they are returned to a beverage bottling plant for re-use, and before said case is sent to said case delatcher.

8. The reusable packaging system of claim 7, wherein said case filler comprises a bottle filling machine and a bottle packing machine for packing filled bottles of beverage into a washed and erected case.

9. The reusable packaging system of claim 5, wherein each of said male and female snap lock halves has a quadrilateral configuration, said male snap lock half has four corner protrusions, and said female snap lock half have four corner channels.

10. The reusable packaging system of claim 1, wherein said male and female snap lock halves are secured to respective ones of said pairs of side flaps and end flaps of said bottom of said case, in such a manner as not to be removable therefrom.

11. The reusable packaging system of claim 6, wherein said ink is adhered to any respective outer surface of said case which has been corona treated in a corona treatment unit which is arranged to corona treat the outer surfaces of the top, bottom, sides, and ends, of a washed open case when in its flat configuration; and wherein said ink is carried by a solvent which is washable by said box washer.

12. The reusable packaging system of claim 11, wherein said box washer is arranged to wash said ink which has been printed on a case using water and a washing solution which are sprayed under pressure onto the case being washed.

13. The reusable packaging system of claim 12, wherein said box washer comprises a closed loop system, whereby after said water and washing solution have been used, they are filtered, treated, and re-used.

14. The reusable packaging system of claim 2, wherein said corona treatment unit is arranged so as to expose the surfaces of the case that are being corona treated to gas flames.

15. A reusable, collapsible, washable case for use in a reusable packaging system whereby goods are delivered in said case to a consumer, and said case is returned to a supplier of goods for re-use, said case comprising:

a planar bottom, a planar top, opposed planar sides, and opposed planar ends;

wherein said case is made from plastics sheet material;

wherein said planar bottom comprises a pair of side flaps and a pair of end flaps, wherein one of said pair of side flaps and said pair of end flaps overlies the other pair of flaps when in an assembled condition, and wherein said overlying pairs of flaps are secured one to another by at least four snap locks, each comprising a mating male snap lock half and a female snap lock half, arranged to be latched together when said overlying pair of flaps are in their overlying condition;

wherein said male snap lock half has a centrally located stem with a closed cap end surrounded by a radially outwardly directed lip, so that the diameter of said closed cap end at said radially directed lip is greater than the diameter of said stem, a skirt surrounding said stem and extending perpendicularly thereto, and a plurality of corner protrusions extending upwardly from said skirt in spaced relation to said stem and to one another;

wherein said female snap lock half has a centrally located opening surrounded by a V-shaped channel and an inwardly and radially directed lip, wherein the diameter of said opening is greater than the diameter of said stem and less than the diameter of said closed cap at said radially outwardly directed lip, a skirt surrounding said opening, and a plurality of corner channels shaped and dimensioned to receive and accommodate said plurality of corner protrusions therein and in spaced relation to said opening and to one another; and wherein said planar top comprises at least one pair of flaps which close said case when they are in a case-closing condition so as to be perpendicular to said opposed planar sides and said opposed planar ends, and so as to be parallel to said planar bottom.

16. The reusable, collapsible, washable case of claim 15, wherein said plastics sheet material is chosen from the group consisting of polypropylene sheet, polyethylene sheet, co-polymers of polypropylene and polyethylene sheet, polystyrene sheet, corrugated polypropylene sheet, corrugated co-polymers of polypropylene and polyethylene sheet, and corrugated polystyrene sheet.

17. The reusable, collapsible, washable case of claim 15, wherein each of said male and female snap lock halves has a quadrilateral configuration, said male snap lock half has four corner protrusions, and said female snap lock half have four corner channels.

18. The reusable, collapsible, washable case of claim 15, wherein said male and female snap lock halves are secured to respective ones of said pairs of side flaps and end flaps of said bottom of said case, in such a manner as not to be removable therefrom.

* * * * *